No. 611,447. Patented Sept. 27, 1898.
W. J. CURRY.
GRATER.
(Application filed Dec. 30, 1897.)
(No Model.) 2 Sheets—Sheet 1.
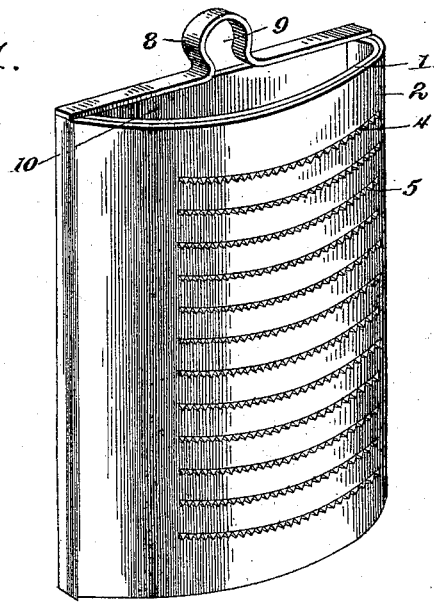
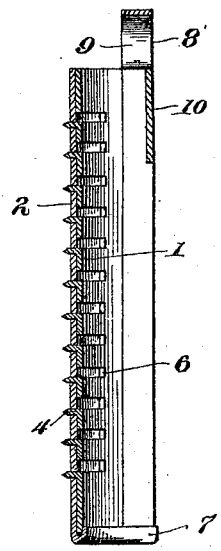
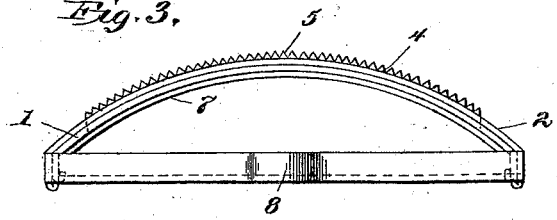
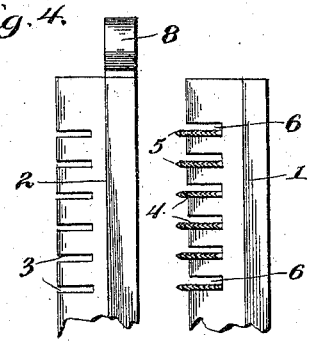
Witnesses
Howard D. Orr.
Arthur Page
William J. Curry Inventor
by Marion & Marion
Attorneys No. 611,447. Patented Sept. 27, 1898.
W. J. CURRY.
GRATER.
(Application filed Dec. 30, 1897.)
(No Model.) 2 Sheets—Sheet 2.
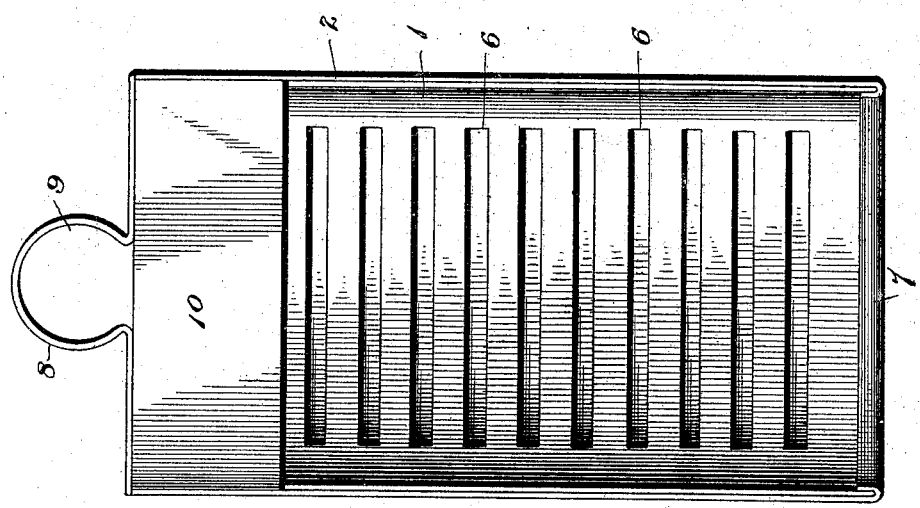
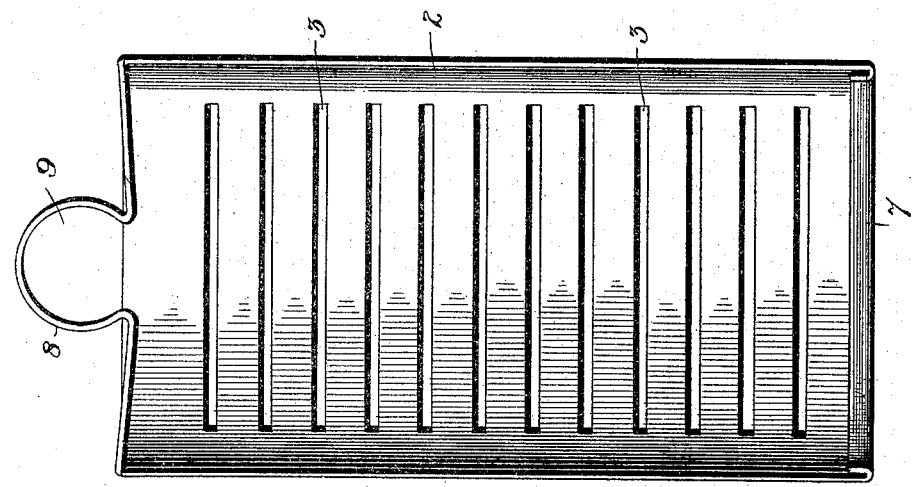
Witnesses: William J. Curry, Inventor
By Marion & Marion
His Attorneys

UNITED STATES PATENT OFFICE.

WILLIAM JAMISON CURRY, OF NANAIMO, CANADA.

GRATER.

SPECIFICATION forming part of Letters Patent No. 611,447, dated September 27, 1898.

Application filed December 30, 1897. Serial No. 664,650. (No model.) Patented in Canada April 16, 1896, No. 59,647.

*To all whom it may concern:*

Be it known that I, WILLIAM JAMISON CURRY, a citizen of the Dominion of Canada, residing at Nanaimo, county of Vancouver, Province of British Columbia, Canada, have invented certain new and useful Improvements in Graters, (for which Letters Patent of the Dominion of Canada have been granted, dated April 16, 1896, No. 59,647;) and I do hereby declare the following to be a full, clear, and exact description of the invention, such as will enable others skilled in the art to which it appertains to make and use the same.

This invention relates to improvements in graters.

The object of the invention is to provide a device of the character mentioned which is especially adapted for grating fruits, vegetables, &c., and one which is so constructed that the parts thereof may be readily separated for removing the grated particles, cleansing, and other purposes.

A further object of the invention is the provision of a grater comprehending an inner and an outer member, the former of which is provided with a series of grating-ridges adapted to project through a series of slots formed in the outer member, in combination with simple and efficient means for securing the members together, which means are adapted to permit quick and easy separation of the members when so desired.

With these and other objects in view, which will appear as the nature of the improvements is better understood, the invention consists substantially in the novel construction, combination, and arrangement of parts, as will be hereinafter fully described, illustrated in the accompanying drawings, and pointed out in the appended claims.

In the drawings, Figure 1 is a perspective view of a grater constructed in accordance with the present invention. Fig. 2 is a longitudinal sectional view thereof. Fig. 3 is an end elevation. Fig. 4 is a side elevation, broken away, of the inner and outer members separated. Fig. 5 is a rear elevation of the outer member. Fig. 6 is a rear elevation of my device in position for operation.

Referring to the drawings, the numerals 1 and 2 designate, respectively, the inner and outer members of the herein-described grater, said members being formed of any suitable material and concavo-convex in cross-section, whereby the member 1 is adapted to snugly fit within the member 2.

The outer member 2 is provided throughout its length with a series of parallel-spaced transverse slots 3, which series terminates a short distance from each of the ends of said member, and formed on the member 1 is a series of parallel-spaced transverse grating-ridges 4, corresponding in number and position to the slots 3. Each of said ridges 4 is formed by punching the body of the inner member 1 and bending the punched portion thereof at substantially right angles, the outer edge of said punched portion being serrated, as at 5, so as to effectually act upon the fruit or vegetable being grated, and by reason of forming the ridges 4 by punching it will be seen that a series of slots 6 is provided in the member 1, which slots will permit easy removal of any grated particles adhering to said member and also facilitate cleansing of the latter.

When the member 1 is positioned within the member 2, the grating-ridges 4 lie within the slots 3 and project beyond the outer surface of said member 2, the slots 3 being sufficiently wide to fit loosely over the ridges 4, and hence it is evident that as the fruit or vegetable is reciprocated longitudinally of the grater the same will be acted upon by the ridges 4 and effectually grated.

Formed on the lower end of the outer member 2 is a transversely-extending retaining-flange 7, which is turned inwardly, and said flange is adapted to receive the lower end of the inner member 1 when the latter is placed within the outer member 2. A transversely-extending spring locking-strip 8 is secured to the end of the member 2, which is opposite to the flange 7, and said locking-strip is provided at a point intermediate its ends with a finger-loop 9, by which the strip may be operated, as hereinafter described, and also to afford means for suspending the grater from a hook or the like. Secured to the end of the inner member 1, which lies adjacent to the locking-strip 8, is a transverse engaging strip 10, adapted to brace said inner member, but said strip is primarily designed to be contacted by the spring locking-strip 8 when the members 1 and 2 are placed together, the portion 1 being held in position between the flange 7 and the strip 8. It will thus be seen that when the lower end of the member 1 has been inserted within the retaining-flange 7 and the ridges 4 project through the slots 3 the locking-strip 8 contacts with and exerts its pressure against the engaging strip 10, whereby the member 1 is securely held within the member 2 and can only be removed therefrom by releasing the strip 8. It will also be noted that the ridges 4 are slightly curved from the end of the grater upon which the locking-strip 8 is mounted, the purpose of which is to afford better action upon the fruit or vegetable being grated.

The manner of using the herein-described grater is as follows: The members 1 and 2 being assembled, as in Figs. 1, 2, and 3, the fruit or vegetable is reciprocated longitudinally of the grater in the usual manner. During this movement the ridges 4 act upon the fruit or vegetable, and when it is desired to remove the particles which may adhere to the grater the finger-loop 9 is grasped and pressure exerted thereon in order to draw the locking-strip 8 from contact with the engaging strip 10. The inner member 1 is now free to be withdrawn from the outer member 2, and as the ridges 4 pass out of the slots 3 any grated particles which adhere to said ridges are caused to remain upon the member 2, from which the same may be brushed with the hand. When it is desired to replace the member 1, the lower end of the same is inserted into the flange 7 and the ridges 4 forced through the slots 3. The locking-strip 8, by reason of its spring nature, now engages the strip 10, which engagement locks the members together, and the operation of grating may again be proceeded with, the locking-strip 8 also serving as a brace for the member 2 to strengthen the same.

From the foregoing it will be seen that the present invention provides a grater the parts of which may be readily separated for removing the grated particles, cleansing, and other purposes. Moreover, the device is exceedingly simple and may be manufactured at a comparatively low figure.

While the construction herein shown and described is what is believed to be a preferable embodiment of the invention, it is to be understood that I do not limit myself thereto, as various changes in the form, proportion, and minor details of construction may be resorted to, and the right is therefore reserved to modify or vary the invention as falls within the spirit and scope thereof.

Having thus described the invention, what is claimed as new, and desired to be secured by Letters Patent, is—

1. A grater, comprising an inner member, an outer member provided with a series of slots, a series of grating-ridges carried by said inner member and projecting through said slots, a retaining-flange formed on said outer member and adapted to receive the inner member, and a locking-spring adapted to engage said inner member for retaining the latter in the outer member, substantially as described.

2. A grater, comprising an inner member, an outer member provided with a series of slots, a series of serrated grating-ridges carried by said inner member and projecting through said slots, a retaining-flange formed on said outer member and adapted to receive the inner member, an engaging strip carried by the inner member, and a locking-spring adapted to contact with said engaging strip for retaining the inner member in the outer member, substantially as described.

3. A grater, comprising an inner member, an outer member provided with a series of slots, a series of grating-ridges carried by the inner member and projecting through said slots, a retaining-flange formed on one end of the outer member and adapted to receive one end of the inner member, an engaging strip carried by the inner member, and a locking-spring also carried by the outer member and adapted to contact with said engaging strip for retaining the inner member within the outer member, substantially as described.

4. A grater, comprising an inner member, an outer member provided with a series of slots, a series of serrated grating-ridges carried by the inner member and projecting through said slots, a retaining-flange formed on one end of the outer member and adapted to receive one end of the inner member, an engaging strip carried by the inner member, a spring locking-strip also carried by the outer member and adapted to contact with said engaging strip for retaining the inner member within the outer member, and a finger-loop formed in said locking-strip, substantially as and for the purpose described.

In witness whereof I have hereunto set my hand in presence of two witnesses.

WILLIAM JAMISON CURRY.

Witnesses:
  GEO. NORRIS,
  CHAS. SANTY.

It is hereby certified that in Letters Patent No. 611,447, granted September 27, 1898, upon the application of William Jamison Curry, of Nanaimo, Canada, for an improvement in "Graters," errors appear requiring correction as as follows: The Canadian patent previously obtained for the said invention is erroneously described in the printed heading and in the preamble of the specification as "April 16, 1896, No. 59,647;" whereas it should have been described as *April 16, 1898, No. 59,647*, and that the said Letters Patent should be read with these corrections therein that the same may conform to the record of the case in the Patent Office.

Signed, countersigned, and sealed this 4th day of October, A. D., 1898.

[SEAL.]                                         THOS. RYAN,
*First Assistant Secretary of the Interior.*

Countersigned:
    C. H. DUELL,
        *Commissioner of Patents.*